United States Patent [19]

Kreyenborg et al.

[11] Patent Number: 5,122,286
[45] Date of Patent: Jun. 16, 1992

[54] FILTER CHANGING APPARATUS FOR FLOWABLE PLASTIC MATERIAL

[75] Inventors: Udo Kreyenborg, Münster-Kinderhaus; Manfred Hangmann, Münster; Ludger Wilken-Trenkamp, Münster-Mecklenbeck, all of Fed. Rep. of Germany

[73] Assignee: Kreyenborg Verwaltungen und Beteiligungen KG, Münster, Fed. Rep. of Germany

[21] Appl. No.: 626,476

[22] Filed: Dec. 12, 1990

[30] Foreign Application Priority Data

Dec. 19, 1989 [DE] Fed. Rep. of Germany ....... 3941831

[51] Int. Cl.⁵ .................................. B01D 24/46
[52] U.S. Cl. .................................. 210/791; 210/411; 425/197
[58] Field of Search ............. 425/197; 210/767, 791, 210/349, 398, 236, 418, 411

[56] References Cited

U.S. PATENT DOCUMENTS

| | | | |
|---|---|---|---|
| 3,455,357 | 7/1969 | Zink | 146/174 |
| 3,669,166 | 6/1972 | Colin | 425/199 |
| 4,202,659 | 5/1980 | Kinoshita | 425/199 |
| 4,332,541 | 6/1982 | Anders et al. | 210/791 |
| 4,597,870 | 7/1986 | Lambertus | 210/341 |
| 4,701,118 | 10/1987 | Koching et al. | 210/236 |
| 4,725,215 | 1/1988 | Kreyenborg | 425/185 |
| 5,004,414 | 4/1991 | Stude et al. | 425/185 |

FOREIGN PATENT DOCUMENTS 1097660 1/1961 Fed. Rep. of Germany .
2119545 10/1972 Fed. Rep. of Germany .

Primary Examiner—Bernard Nozick
Attorney, Agent, or Firm—Peter K. Kontler

[57] ABSTRACT

A filter changing apparatus for use with an extruder for plasticized synthetic plastic material has a housing with one or more bores for reciprocable cylindrical carriers of tubular filters. Each carrier is movable between at least one first position in which a stream of plastic material can flow from an inlet of the housing, axially into one end of the filter, radially outwardly from the filter and into an outlet of the housing, and at least one second position in which the carrier seals the inlet from the outlet or permits expulsion of contaminants and plastic material from the filter in a direction toward the inlet or into a second outlet of the housing.

15 Claims, 3 Drawing Sheets ically, a cylindrical filter is mounted for angular movement in a housing which is provided with an inlet for unfiltered plastic material and an outlet for filtered plastic material.

FILTER CHANGING APPARATUS FOR FLOWABLE PLASTIC MATERIAL

BACKGROUND OF THE INVENTION

The present invention relates to apparatus for processing flowable plastic materials, and more particularly to improvements in apparatus for removably supporting one or more filters between one or more extruders and one or more molds for plasticized synthetic plastic material. Still more particularly, the invention relates to improvements in filter changing apparatus for plastic materials and to improvements in methods of manipulating or operating such filter changing apparatus.

U.S. Pat. No. 4,597,870 to Lambertus discloses a filter device for a screw extruder wherein a housing supports a reciprocable carrier or slide member for a composite tubular filter or sieve. The carrier can move the filter to and from an operative position in which heated plastic material can flow from an inlet to an outlet of the housing by passing radially inwardly through the interstices of and into the interior of the filter to leave at one axial end of the filter on its way toward an outlet of the housing. A drawback of the patented apparatus is that pressurized plastic material which flows from the inlet of the housing, radially inwardly into the filter and thereupon axially and out of the filter toward the outlet of the housing is likely to reduce the sizes of interstices for the flow of plastic material into the filter. Moreover, as the filter gathers a certain amount of impurities, its resistance to the flow of plastic material from the inlet of the housing toward the interior of the filter increases with attendant rise in pressure of conveyed plastic material, i.e., the rising pressure is even more likely to reduce the sizes of interstices in the filter. This, in turn, enables the intercepted impurities or contaminants to further reduce the combined cross-sectional area of unobstructed interstices so that the filter must be inspected, removed and cleaned, or discarded and replaced with a fresh filter, after a relatively short interval of use. Moreover, elevated pressure is often detrimental to the plastic material; for example, the chemical composition of certain thermoplastic materials is changed or the material is actually destroyed when the pressure upon such material reaches a predetermined value. Still another drawback of a filter which is installed in the path for the flow of plastic material in such a way that the plastic material must flow radially inwardly in order to penetrate into the interior of the filter is that the intercepted contaminants gather at the exterior of the filter. Such deposits of contaminants interfere with movability of the reciprocable carrier or slide member which is used to move the filter to and from its operative position. As a rule, the carrier is a cylinder which is a snug fit in a cylindrical bore or hole of the filtering apparatus.

U.S. Pat. No. 3,455,357 to Zink discloses a filter or screen changer apparatus wherein a pivotable or rockable pendulum type carrier supports two tubular filters one of which is accessible when the other is in actual use and the other way around. A drawback of pivotable or rockable carriers for filters which are used to intercept impurities in a stream of heated plastic material is that proper sealing of the carrier in the housing presents many problems and that the apparatus is rather complex and bulky.

German Auslegeschrift No. 1 097 660 of Corbett discloses an apparatus which is similar to that of Zink. Thus, a cylindrical filter is mounted for angular move- German Auslegeschrift No. 2 111 545 of Lambertus discloses an apparatus wherein a plate-like carrier supports several axially parallel filters. The carrier is movable between a plurality of positions in each of which a different set of filters can receive plasticized material from an extruder.

Commonly owned U.S. Pat. No. 4,725,215 to Kreyenborg et al. discloses an apparatus with an exchangeable cylindrical filter holder which is reciprocable in a housing and contains a substantially plate-like filter disposed substantially diametrically of the holder.

An apparatus with several filter holders of the type disclosed by Kreyenborg et al. is described and shown in commonly owned copending patent application Ser. No. 07/446,557 filed Dec. 5, 1989 for "Apparatus for filtering plasticized materials in extruders and like machines", now U.S. Pat. No. 5,004,414 granted Apr. 2, 1991.

OBJECTS OF THE INVENTION

An object of the invention is to provide an apparatus which is constructed and assembled in such a way that the combined cross-sectional area of interstices, holes, ports and/or other passages for the flow of plastic material through one or more filters is not affected by any factors other than the extent of contamination of the filter or filters.

Another object of the invention is to provide an apparatus wherein the filter or filters are readily accessible for inspection and removal or can be readily moved to positions for cleaning while remaining in the housing of the filter supporting apparatus.

A further object of the invention is to provide a novel and improved combination of filter and filter carrier for use in the above outlined apparatus.

An additional object of the invention is to provide a novel combination of filter and filter housing for use in the above outlined apparatus.

Still another object of the invention is to provide an apparatus which can be used in, or in combination with, existing extruders and like machines as a superior substitute for heretofore known apparatus.

An additional object of the invention is to provide an apparatus wherein the filter or filters necessitate less frequent cleaning than in heretofore known apparatus.

A further object of the invention is to provide a novel and improved housing for use in the above outlined apparatus.

Another object of the invention is to provide a novel and improved method of manipulating or operating an apparatus of the above outlined character.

A further object of the invention is to provide a novel and improved method of expelling impurities from clogged or partially clogged filters for plastic material in the above outlined apparatus.

An additional object of the invention is to provide a novel and improved method of operating an apparatus with one or more reciprocable carriers for tubular or substantially tubular filters for plasticized thermoplastic or like materials.

SUMMARY OF THE INVENTION

One feature of the present invention resides in the provision of a method of operating or manipulating a screen or filter changing apparatus for flowable plastic material wherein at least one carrier for a substantially tubular hollow filter is sealingly received and is reciprocable in a housing between at least one first position in which the filter is disposed between a material-admitting inlet and a material-discharging outlet of the housing and at least one second position in which the carrier and the filter can be withdrawn from the housing or in which the filter can be relieved of accumulated contaminants. The method comprises the steps of supplying plastic material into the inlet of the housing, at least in the at least one first position of the carrier, and establishing in the reciprocable carrier and in the filter at least one path for admission of plastic material from the inlet into the interior of the filter (by a route other than that by which filtered plastic material leaves the filter) so that the plastic material which has been admitted into the filter can reach the outlet of the housing by flowing from the interior of and preferably radially outwardly through the filter through interstices in other than that portion of the path which is provided in the filter.

The step of establishing at least one path can include providing in one of the two longitudinal ends of the filter at least one inlet for admission of plastic material into the interior of the filter.

The method can further comprise the steps of providing in the carrier a chamber (e.g., an annular chamber) which preferably at least partially surrounds the filter and communicates with the outlet of the housing, at least in the at least one first position of the carrier. The plastic material then flows through the interstices of the tubular filter and into the chamber on its way toward and into the outlet of the housing. Such method can further comprise the step of expelling (when necessary) plastic material from the interior of the filter and along the at least one path. Such expelling step can include raising the pressure of plastic material at the outlet of the housing above the pressure at the inlet so that the material is compelled to flow from the outlet into the chamber, from the chamber through the interstices of the filter and into the interior of the filter, and from the filter along the at least one path. This method can further comprise the steps of moving the carrier to the at least one second position not later than in the course of the pressure raising step, and providing the housing with a second outlet to receive plastic material which is expelled from the interior of the filter by way of the at least one path in the at least one second position of the carrier and in response to the pressure raising step.

Another feature of the invention resides in the provision of a screen- or filter changing apparatus for flowable plastic material. The improved apparatus comprises a housing having at least one hole (e.g., in the form of a through bore), at least one material-admitting inlet which communicates with the hole, and at least one material-discharging outlet which communicates with the hole. The apparatus further comprises a carrier which is sealingly received in and is reciprocable relative to the hole, and a substantially tubular hollow filter which is provided in or on the carrier. The carrier and the filter are movable between at least one first position in which the filter is disposed between the at least one inlet and the at least one outlet, and at least one second position (particularly a second position in which the filter is accessible for removal from the carrier). The carrier and the filter define at least one path for admission of plastic material from the inlet of the housing into the interior of the filter so that the thus admitted plastic material can reach the outlet by flowing from the interior of and substantially radially outwardly through the interstices of the filter in the at least one first position of the carrier. The plastic material which leaves the interior of the filter must flow from the internal surface of the substantially tubular filter, through the interstices in the substantially tubular filter and to and beyond the external surface of the filter on its way toward the at least one outlet of the housing.

The filter can comprise a hollow substantially cylindrical sieve or screen. Such filter can be a so-called multiple-tube or candle type filter.

The carrier and the filter can define an elongated chamber which at least partially surrounds the filter and communicates with the outlet of the housing, at least in the at least one first position of the carrier. The aforementioned path can be disposed at one end of the elongated chamber. The apparatus can further comprise a deflector or distributor of plastic material. Such deflector can be installed within and is preferably spacedly surrounded by the filter.

The carrier can comprise a main portion which surrounds at least the major part of the chamber around the filter, and a preferably detachable second portion at the other end of the filter (i.e., at the other end of the chamber). The main portion of the carrier includes a wall which is provided with an opening serving to communicatively connect the chamber with the outlet of the housing in the at least one first position of the carrier. Such apparatus can further comprise means (e.g., one or more threaded fasteners) for preferably separably securing the deflector to the second portion of the carrier. The carrier can comprise a third portion (e.g., a ring) which surrounds the at least one path and is connected with the deflector.

In accordance with another presently preferred embodiment, the carrier comprises a first section which receives one end of the tubular filter, a second section which receives the other end of the filter, and a deflector or distributor which is spacedly surrounded by the filter and connects the first and second sections to each other. The at least one path is defined by the first section and the one end of the filter, and the two sections define an opening which at least partially surrounds the filter and communicates with the outlet of the housing, at least in the at least one first position of the housing. Such apparatus can further comprise means (e.g., one or more threaded fasteners) for separably securing the deflector to at least one of the sections, particularly to the second section. The second section of the twin-section carrier and the housing can define a gas-evacuating passage which establishes communication between the exterior of the filter and the atmosphere in the at least one second position of the carrier.

The housing can be provided with a second outlet which communicates with the at least one path in the at least one second position of the carrier to permit evacuation of flowable plastic material from the interior of the filter along the at least one path and through the second outlet.

The carrier can include a wall which surrounds at least a portion of the filter and has an aperture in communication with the outlet of the housing in the at least one first position of the carrier. Such housing is preferably further provided with a channel which communicates with the outlet and also communicates with the aperture, at least in the at least one first position of the carrier.

The housing can be provided with at least one second hole which communicates with the at least one inlet and with the at least one outlet. Such apparatus then further comprises a second carrier which is sealingly and reciprocably received in the second hole, and a substantially tubular second hollow filter or screen which is provided in or on the second carrier. The second carrier and the second filter are movable between at least one first position in which the second filter is disposed between the at least one inlet and the at least one outlet of the housing, and at least one second position (preferably a position in which the second filter is accessible for detachment from the second carrier). The second carrier and the second filter define at least one second path for admission of plastic material from the at least one inlet into the interior of the second filter so that the thus admitted plastic material can reach the at least one outlet by flowing from the interior of the second filter and substantially radially outwardly through the interstices of the second filter in the at least one first position of the second carrier. This renders it possible to inspect or remove or clean one of the filters while the other filter is properly positioned between the at least one inlet and the at least one outlet of the housing.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
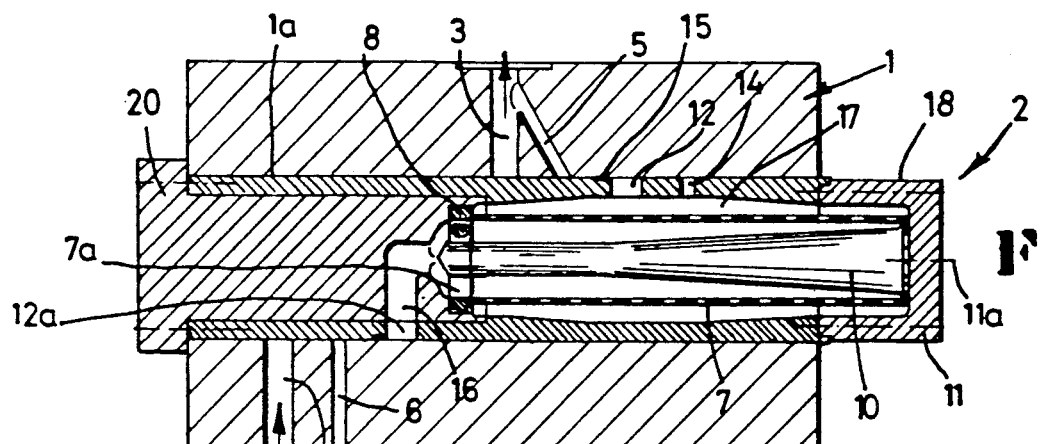
FIG. 1 is an axial sectional view of an apparatus which embodies one form of the invention and wherein the carrier for a tubular filter is maintained in a position in which the carrier seals the inlet for unfiltered plastic material from the outlet for filtered plastic material.

The apparatus which is shown in FIGS. 1 to 4 comprises a housing 1 having at least one cylindrical bore or hole 1a to snugly (sealingly) receive an elongated cylindrical carrier 2 for an elongated tubular filter 7. The carrier 2 is maintained in an axial position in which the filter 7 is accessible for inspection or withdrawal from the apparatus. A flange 20 at the left-hand axial end of the carrier 2 abuts the adjacent end face of the housing 1, and such flange forms part of a plug for one end of a main portion 2a of the carrier. This main portion 2a includes or constitutes a cylindrical wall with a relatively large radially extending opening 12 and a relatively small radial aperture 14 adjacent the opening 12. The carrier 2 further includes a detachable second portion or cap 18 which is separably secured to the adjacent open end of the main portion 2a by several threaded fasteners 11 (indicated by phantom lines). The housing 1 has a radially extending inlet 4 for admission of unfiltered plastic material, a radially extending outlet 3 for filtered plastic material, a radially extending second outlet 6 which is adjacent the inlet 4, and an inclined channel 5 which communicates with the outer end of the outlet 3 and with the bore or hole 1a. The inlet 4 can receive plastic material from an extruder, and the outlet 3 can admit filtered plastic material into one or more cavities or the like, not shown.

Figure 3:
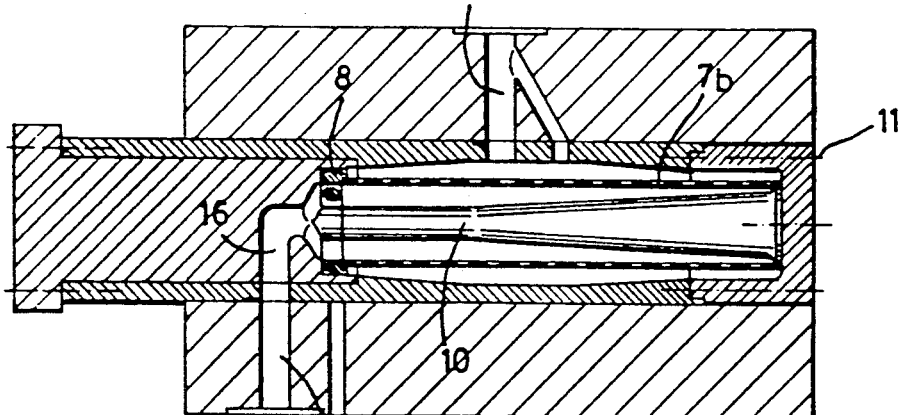
FIG. 3 shows the structure of FIGS. 1 and 2 but with the carrier in an operative (first) position in which a stream of plasticized material is free to flow from the inlet of the housing, axially into the filter and radially from the filter into the outlet of the housing.

The carrier 2 and the filter 7 define an elongated annular chamber 17 which surrounds the major portion of or the entire filter and can admit filtered plastic material into the outlet 3 when the inner end of the outlet registers with the opening 12 (see FIG. 3 which shows the carrier 2 in the first or operative position). One end of the filter 7 is adjacent the bottom wall of the carrier portion 18 and the other end of the filter is surrounded by a ring-shaped third portion 8 of the carrier 2; such ring-shaped portion 8 surrounds an inlet 7a which is provided in the respective end of the filter 7 and establishes a first portion of a path for admission of unfiltered plastic material from the inlet 4 into the internal space of the filter. The other portion of this path is established by an L-shaped passage or channel 16 in the plug of the carrier 2. The axially extending portion of the passage 16 communicates with the inlet 7a, and the radially extending portion of this passage communicates with the inlet 4 when the carrier 2 is moved (e.g., by a cylinder and piston unit, not shown) to the axial position of FIG. 3. At such time, the inlet 4 registers with the passage 16, the second outlet 6 is sealed by the main portion or wall 2a of the carrier 2, the outlet 3 communicates with the chamber 17 by way of the opening 12 in the main portion 2a, and the channel 5 communicates with the aperture 14 in the main portion 2a. Thus, a stream of plastic material which is to be relieved of metallic particles and/or other impurities or contaminants is compelled to flow from the extruder (not shown) into the inlet 4, thereupon along the path which is defined by the passage 16 and inlet 7a, into the interior of the tubular (preferably cylindrical) filter 7, through the radial interstices 7b of the filter from the internal surface to and beyond the external surface of the filter (i.e., into the chamber 17), through the opening 12 and aperture 14, through the outlet 3 and the channel 5, and into one or more cavities, not shown. In other words, the stream of plastic material enters the interior of the filter 7 at one axial end (via inlet 7a) and leaves the internal space of the filter by flowing radially outwardly on its way into the chamber 17 and thence into the outlet 3 and channel 5. This greatly reduces the likelihood of premature contamination of interstices 7b because the plastic material to be filtered does not tend to reduce the diameter of the filter 7. Moreover, the intercepted contaminants gather in the interior of the filter 7 so that they cannot interfere with or obstruct the movements of the carrier 2 relative to the housing 1, i.e., the intercepted impurities do not enter the clearance (if any) between the external surface of the carrier 2 and the surface surrounding the bore or hole 1a in the housing 1.

The illustrated cylindrical sieve or filter 7 can be replaced with a so-called multiple-tube or candle filter without departing from the spirit of the invention.

The apparatus of FIGS. 1 to 4 further comprises an elongated partly cylindrical and partly conical deflector or distributor 10 one end of which is centered by the ring-shaped carrier portion 8 and the other end of which is preferably separably secured to the bottom wall of the carrier portion 18 by one or more threaded fasteners 11a. The purpose of the deflector 10 is to establish a rigid connection between various portions of the carrier 2 as well as to ensure that plastic material which has entered the internal space of the filter 7 along the path 7a, 16 is distributed all along the internal surface of the filter, i.e., that all or nearly all interstices 7b of the filter convey streamlets of filtered plastic material into the adjacent portions of the chamber 17. The deflector 10 ensures uniform or substantially uniform distribution of unfiltered plastic material in the axial as well as in the circumferential direction of the filter 7.

The outer end of the opening 12 in the main portion or wall 2a of the carrier 2 communicates with an aerating recess 15 which is provided in the external surface of the main portion 2a. A second aerating recess 15a is provided in the external surface of the main portion 2a adjacent a radial opening 12a which is provided in the main portion 2a and registers with the radially extending portion or leg of the L-shaped passage 16 in the plug of the carrier 2.

The mode of operation of the apparatus of FIGS. 1 to 4 is as follows:

FIG. 1 shows the carrier 2 in the right-hand end position which is determined by the housing 1 in cooperation with the flange 20. The opening 12 and the aperture 14 communicate with the chamber 17 but are sealed from the outlet 3 and channel 5. Furthermore the opening 12a is sealed from the inlet 4 as well as from the second outlet 6. The second portion 18 of the carrier 2 is accessible, i.e., this portion can be detached from the main portion 2a upon removal of the threaded fasteners 11 so that the person or persons in charge can gain access to the right-hand end of the filter 7. Such filter can be withdrawn from the main portion 2a for the purposes of inspection, cleaning or replacement.

When the cleaning of the filter 7 is completed, or when the person or persons in charge decide to replace the illustrated filter 7 with a fresh filter, the filter is inserted into the main portion 2a of the carrier 2 and the second portion 18 is reattached to the main portion by threaded fasteners 11. The deflector 10 may but need not be detached from the second portion 18 after the latter is detached from the main portion 2a. The properly inserted fresh or cleaned filter 7 extends between the ring-shaped third portion 8 and the bottom wall of the second portion 18 of the carrier 2.

Figure 2:
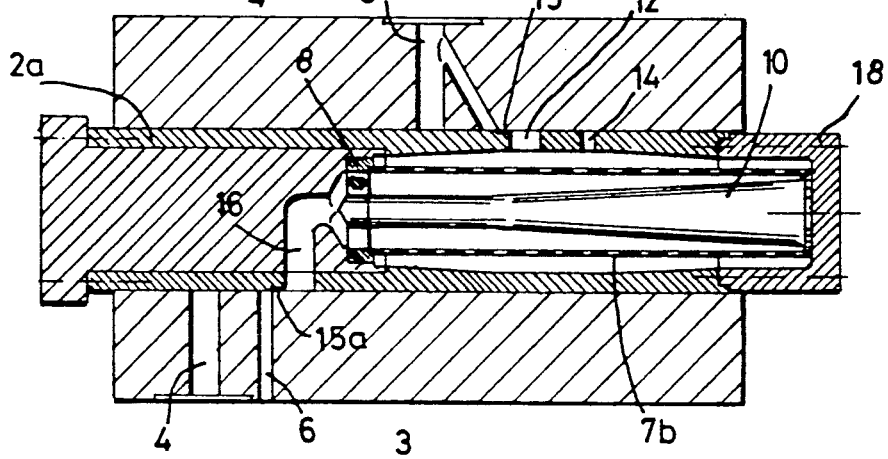
FIG. 2 shows the structure of FIG. 1 but with the filter carrier in a different axial position closer to the operative position.

FIG. 2 illustrates the deaerating stage. The axial position of the carrier 2 has been changed to the extent necessary to establish communication between the external recess 15 of the main carrier portion 2a and the channel 5 in the housing 1. This ensures that a relatively small stream of plastic material can flow from the second hole 1a' (FIG. 9) of the housing 1. The carrier 2' in the second hole 1a' is then maintained in the operative position (see the position of the carrier 2 in FIG. 3), and diversion of a relatively small streamlet of plastic material from the second hole 1a' into the recess 15 does not result in a pronounced drop of pressure and/or rate of flow of plastic material through the second filter 7' (namely the filter which is reciprocable with the carrier 2' in the second hole or bore 1a' of the housing 1). Plastic material which is admitted through the recess 15 gradually fills the chamber 17 and thereupon penetrates through the interstices 7b to fill the internal space of the filter 7 prior to flowing through the inlet 7a and passage 16 into the opening 12a and thence into the recess 15a to leave the apparatus through the second outlet 6 of the housing 1. The person or persons in charge know that all traces of air or any other gas are expelled from the chamber 17 and from the interior of the filter 7 when a stream of plastic material issues at the outer end of the second outlet 6.

The carrier 2 is then ready to be moved axially to the operative or first position of FIG. 3. At such time, the second outlet 6 is sealed from the path 7a, 16 but such path can receive unfiltered plastic material from an extruder through the inlet 4. The admitted plastic material enters one end of the internal space of the filter 7 along the path 7a, 16 and leaves the filter by flowing radially outwardly through the interstices 7b, chamber 17, opening 12 and aperture 14 as well as outlet 3 and channel 5. The thus filtered plastic material is ready for admission into one or more cavities or channels, depending on the nature of products which are to be obtained from plastic material.

Figure 4:
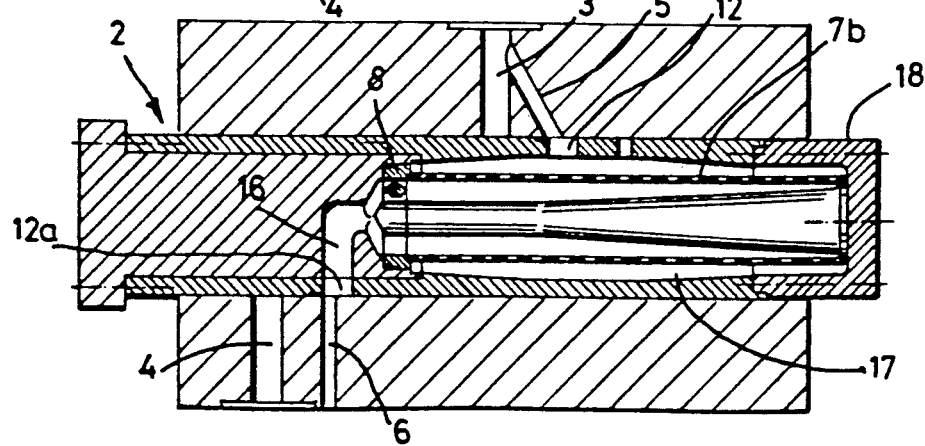
FIG. 4 illustrates the structure of FIGS. 1, 2 or 3 but with the carrier in a fourth position in which the contents of the filter can be expelled by way of a second outlet in the housing for the reciprocable filter carrier.

When the contamination of the filter 7 reaches a stage which warrants expulsion of impurities from the interstices 7b and from the internal surface of the filter, the carrier 2 is shifted to the position of FIG. 4 in which the main portion of the outlet 3 is sealed from but the channel 5 can communicate with the chamber 17 through the opening 12. At the same time, the opening 12a communicates with the second outlet 6. The pressure of plastic material which flows through the filter 7' of the carrier 2' in the other hole or bore 1a' of the housing 1 (FIG. 9) suffices to raise the pressure at the outer end of the outlet 3 above the pressure in the second outlet 6. Therefore, a stream of plastic material which was cleaned during flow through the filter 7' can flow from the outer end of the channel 5, through the opening 12 and chamber 17, and through the interstices 7b of the filter 7 in a direction from the external surface toward and beyond the internal surface of the filter, thereupon axially through the inlet 7a and passage 16 to expel contaminants from the housing 1 by way of the second outlet 6. Plastic material which flows from the chamber 17 into the internal space of the filter 7 entrains the impurities which have gathered along the internal surface of the filter, and such impurities or contaminants are evacuated from the apparatus along the path 7a, 16, through the opening 12a and through the second outlet 6.

Figure 9:
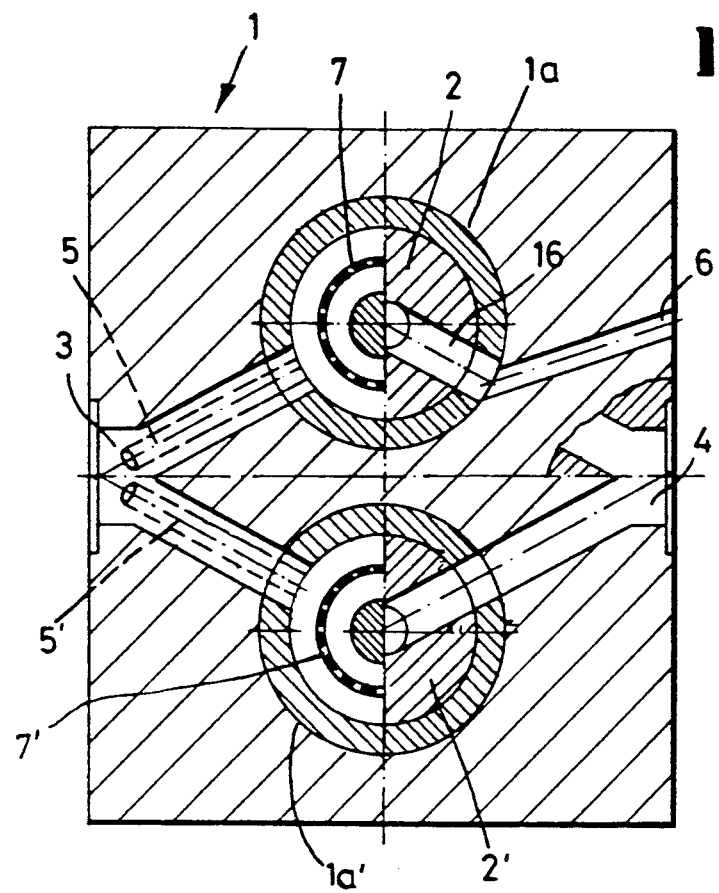
FIG. 9 is a transverse sectional view of an apparatus wherein the housing contains two reciprocable filter carriers of the type shown in FIGS. 1 to 4.

FIG. 9 shows that the housing 1 can have a common inlet 4 for both filters (7 and 7'), a common outlet 3, a discrete channel (5, 5' for each filter) and a discrete second outlet 6 (only one can be seen) for each filter. One of the filters 7, 7' is in actual use while the other filter is being cleaned or replaced, and vice versa.

The contaminants which are intercepted in the interior of the filter 7 or 7' form a layer or hollow cartridge which is surrounded by the internal surface of the respective filter.

FIGS. 5 to 8 show a second apparatus wherein all such parts which are identical with or clearly analogous to corresponding parts of the apparatus of FIGS. 1 to 4 are denoted by similar reference characters plus 200. The housing 201 has a through bore or hole 201a sealingly but reciprocably receiving a somewhat modified cylindrical carrier 202 having a first or main section 230 with a flange 220, and a second section 231 including the cupped portion 218. The aerating recess 215 is elongated and is provided in the external surface of the carrier section 231. The sections 230, 231 are held together by an elongated deflector or distributor 210 which is centered by the ring-shaped portion 208 at one end of the filter 207 and is separably secured to the section 231 at the other end of the filter by one or more threaded or other suitable fasteners 211a. The housing 201 has an inlet 204, a first or main outlet 203 and a second outlet 206. The opening 212 is an annular clearance between the neighboring end portions of the sections 230, 231. and this opening enables filtered plastic material to flow from the annular chamber 217 toward and into the outlet 203 when the carrier 202 assumes the first or operative position of FIG. 7. At such time, plastic material which is to be filtered enters the housing 201 through the inlet 204 and flows along the path 216, 207a into the internal space of the filter 207 to leave the internal space by way of interstices (e.g., in the form of ports or holes) on its way into the channel 217, opening 212 and outlet 203.

Figure 5:
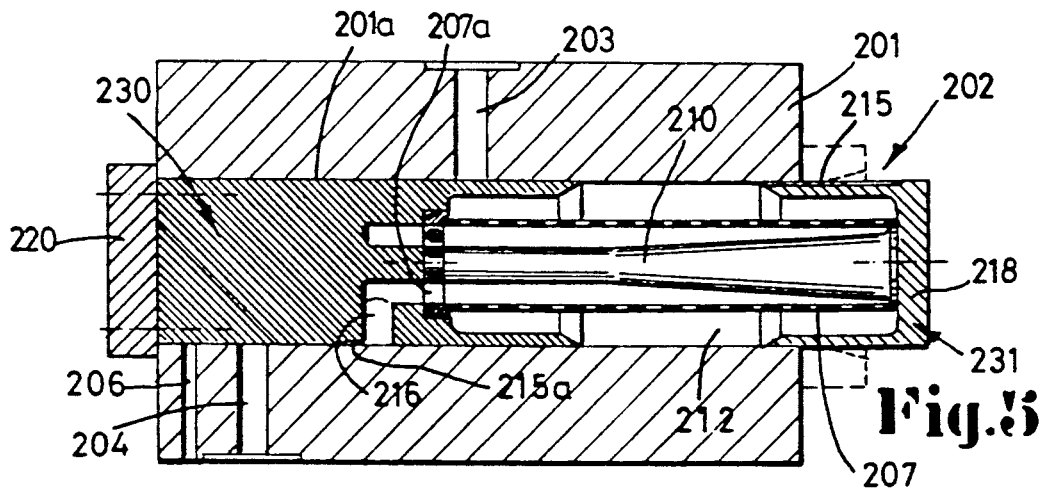
FIG. 5 is an axial sectional view of a second apparatus with a twin-section filter carrier shown in an axial position in which one section of the filter seals the inlet from the outlet of the housing.
Figure 6:
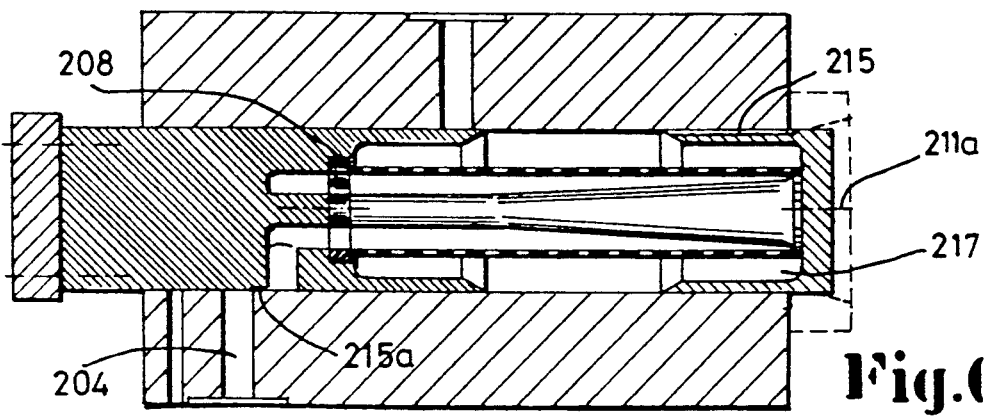
FIG. 6 illustrates the structure of FIG. 5 but with the filter carrier in a different axial position nearer to the operative position.
Figure 7:
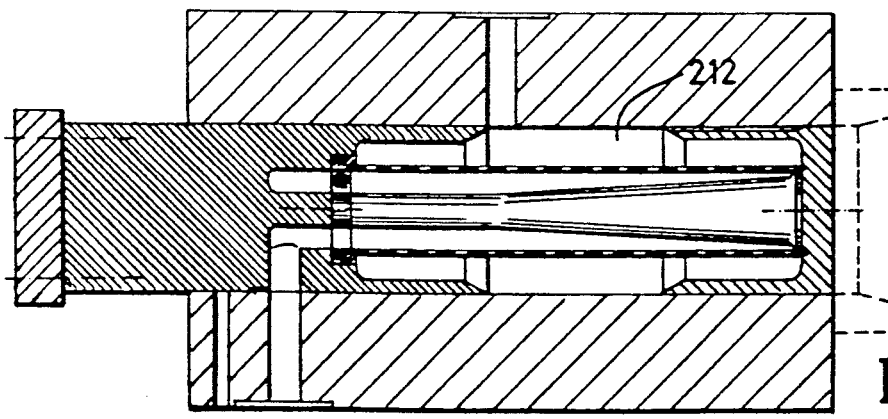
FIG. 7 illustrates the structure of FIGS. 5 or 6 but with the filter carrier in an operative position in which a stream of plasticized thermoplastic or like material is free to flow from the inlet of the housing, axially into the filter, radially outwardly out of the filter and into the outlet of the housing for the reciprocable filter carrier.
Figure 8:
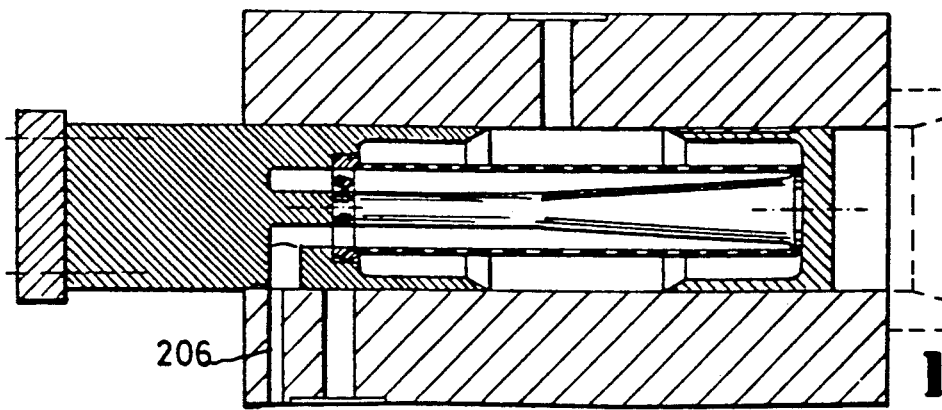
FIG. 8 illustrates the structure of FIGS. 5, 6 or 7 but with the filter carrier in a position in which the contents of the filter can be expelled by way of a second outlet in the housing for the filter carrier.

FIG. 5 shows the carrier 202 in a second axial position in which the section 231 (including or constituting the detachable portion 218) is accessible and enables the person or persons in charge to gain access to the filter 207 upon removal of the fastener or fasteners 211a. FIG. 6 shows the carrier 2 in an intermediate position between the second position of FIG. 5 and the operative position of FIG. 7. FIG. 8 shows the carrier 202 in that axial position in which plastic material can flow from the outlet 203 toward and into the second outlet 206 to evacuate contaminants from the internal space of the filter 207. The latter can constitute a simple cylinder or a so-called multiple-tube or candle filter.

Figure 10:
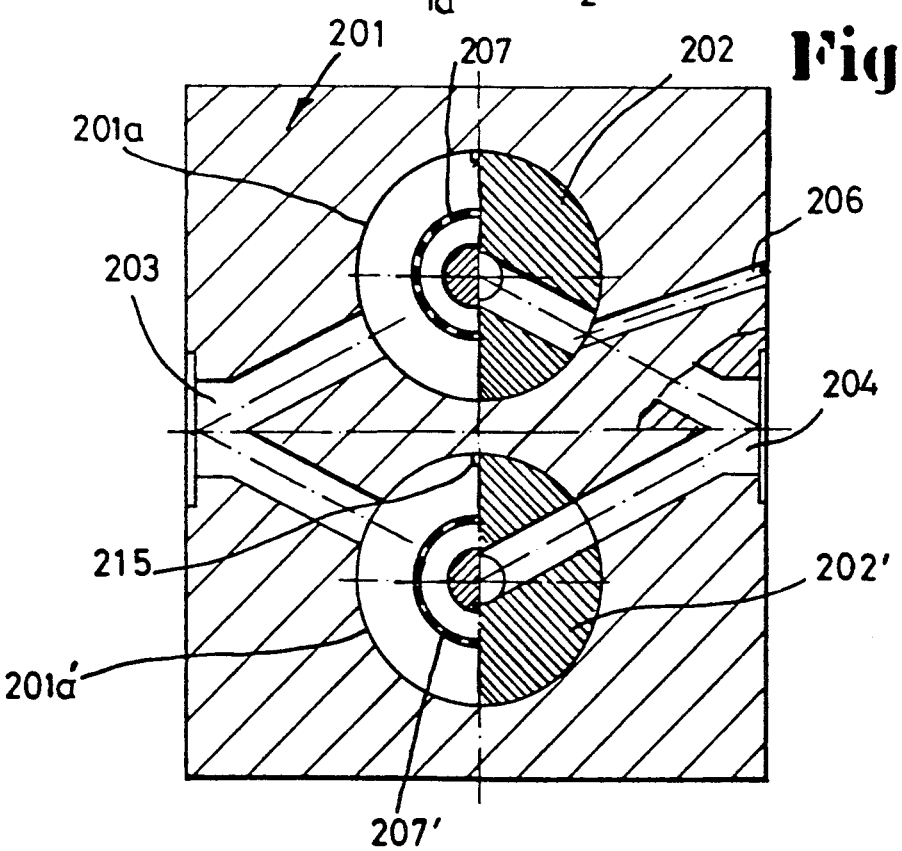
FIG. 10 is a transverse sectional view of an apparatus wherein the housing contains two reciprocable filter carriers of the type shown in FIGS. 5 to 8.

FIG. 10 shows that the housing 201 can be provided with two holes or bores 201a, 201a' for discrete reciprocable carriers 202, 202' which mount the associated filters 207, 207', respectively. The housing 201 has an inlet 204 which is common to the two carriers and a single outlet 203 which is also common to the two carriers. In addition, the housing 201 is provided with discrete second outlets (only the outlet 206 is shown) for each of the carriers 202, 202'.

The carriers 2, 2' and/or 202, 202' can but need not be disposed at different levels.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of operating a filter changing apparatus for flowable plastic material wherein a carrier having a chamber which confines a substantially tubular hollow filter is sealingly received and is reciprocable in a housing between a first position in which the chamber communicates with a material-admitting inlet and a material-discharging outlet of the housing while being otherwise sealed and a second position in which the carrier blocks the inlet and the chamber communicates with the material-discharging outlet of the housing and a contaminant-discharging outlet of the housing while being otherwise sealed, comprising the steps of supplying plastic material into the inlet of the housing in the first position of the carrier; establishing in the reciprocable carrier and in the filter within the carrier a path for admission of plastic material from the inlet into the filter so that the plastic material is filtered by the filter while flowing from the interior of and outwardly through the filter and thereafter into the material-discharging outlet of the housing; and flushing the filter in the second position of the carrier by conveying flushing material in a direction away from the material-discharging outlet of the housing, into the interior of the filter and to the contaminant-discharging outlet.

2. The method of claim 1 of operating a filter changing apparatus wherein the filter in the carrier has a first and a second axial end, wherein said establishing step comprises providing in one axial end of the filter an inlet for admission of plastic material into the interior of the filter.

3. The method of claim 1, wherein the flushing step comprises expelling material from the interior of the filter and along said path, including raising the pressure of plastic material at the material-discharging outlet of the housing above the pressure at the inlet so that the plastic material is compelled to flow from the material-discharging outlet into the chamber, from the chamber through and into the interior of the filter, and from the filter along the at least one path.

4. The method of claim 3, further comprising the step of moving the carrier to said second position not later than in the course of said pressure raising.

5. A filter changing apparatus for flowable plastic material, comprising a housing having a hole, a material-admitting inlet communicating with said hole, a material-discharging outlet communicating with said hole, and a contaminant-discharging outlet communicating with said hole; a carrier sealingly and reciprocably received in said hole and having a chamber; and a substantially tubular hollow filter provided in said chamber, said carrier being reciprocable relative to said housing, with said filter therein, between a first position in which the chamber communicates with said inlet and said material-discharging outlet while being otherwise sealed and a second position in which said carrier blocks said inlet and the chamber communicates with said material-discharging and contaminant-discharging outlets while being otherwise sealed, said carrier and said filter defining a first path for admission of plastic material from said inlet into the interior of the filter in the carrier so that the thus admitted plastic material can reach said material-discharging outlet by flowing from the interior of and substantially radially outwardly through the filter in the carrier in the first position of the carrier, and said contaminant-discharging outlet defining a second path for discharge from said housing, in the second position of the carrier, of flushing material conveyed in a direction away from said material-discharging outlet and substantially radially inwardly through the filter in the carrier.

6. The apparatus of claim 5, wherein said contaminant-discharging outlet is in communication with said first path in said second position of said carrier to permit evacuation of flowable material from the interior of said filter along said first path and through said contaminant-discharging outlet.

7. The apparatus of claim 5, wherein said carrier includes a wall which surrounds at least a portion of said filter and has an aperture in communication with said material-discharging outlet in said first position of said carrier, said housing further having a channel extending from said material-discharging outlet to said hole and being in communication with said aperture in said first position of said carrier.

8. The apparatus of claim 5, wherein said housing has a second hole in communication with said material-admitting inlet and said material-discharging outlet; and further comprising a second carrier sealingly and reciprocably received in said second hole and having a second chamber, and a substantially tubular second hollow filter provided in said second chamber, said second carrier and said second filter being movable to an additional position in which the second chamber communicates with said material-admitting inlet and said material-discharging outlet while being otherwise sealed, and said second carrier and said second filter defining an additional path for admission of plastic material from said material-admitting inlet into the interior of said second filter so that the thus admitted plastic material can reach said material-discharging outlet by flowing from the interior of said second filter and substantially radially outwardly through the second filter in the additional position of said second carrier.

9. The apparatus of claim 5, wherein said filter has an internal surface and an external surface with interstices between said surfaces, the plastic material flowing from said internal surface, through said interstices and to and beyond said external surface on its way from the interior of said hollow filter toward said material discharging outlet.

10. The apparatus of claim 9, wherein said filter comprises a hollow substantially cylindrical sieve.

11. The apparatus of claim 5, wherein said chamber is elongated and material-discharging, said first path is disposed at one end of said elongated chamber.

12. The apparatus of claim 11, further comprising a deflector for flowable plastic material, said deflector being provided within and being spacedly surrounded by said filter.

13. The apparatus of claim 12, wherein said carrier comprises a main portion surrounding said chamber and a detachable second portion at the other end of said chamber, said main portion including a wall provided with an opening which communicatively connects said chamber with said material-discharging outlet in said first position of said carrier.

14. The apparatus of claim 13, further comprising means for securing said deflector to the second portion of said carrier.

15. The apparatus of claim 14, wherein said carrier comprises a third portion surrounding said first path and connected with said deflector.

* * * * *